(12) United States Patent  (10) Patent No.: US 7,726,994 B1
Willey  (45) Date of Patent: Jun. 1, 2010

(54) ELECTRICAL CONNECTOR FOR A HELMET-MOUNTED NIGHT VISION SYSTEM

(75) Inventor: Charles D. Willey, Roanoke, VA (US)

(73) Assignee: ITT Manfacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/363,055

(22) Filed: Jan. 30, 2009

(51) Int. Cl.
H01R 27/00 (2006.01)
(52) U.S. Cl. .................................... 439/218
(58) Field of Classification Search .......... 439/217–222
See application file for complete search history.

(56) References Cited

U.S. PATENT DOCUMENTS

| | | |
|---|---|---|
| 1,603,121 A | 10/1926 | Krone |
| 1,797,184 A | 3/1931 | Alden |
| 2,264,687 A | 12/1941 | Kovatch et al. |
| 2,751,569 A | 6/1956 | Anderson et al. |
| 3,633,151 A | 1/1972 | Sensabaugh |
| 3,980,368 A * | 9/1976 | Fremont ..................... 439/94 |
| 4,329,735 A | 5/1982 | Kawazoe |
| 4,440,464 A | 4/1984 | Spinner |
| 4,445,743 A | 5/1984 | Bakker |
| 4,666,276 A | 5/1987 | Chan |
| 5,017,818 A * | 5/1991 | Dohogne ...................... 310/71 |
| 5,087,207 A * | 2/1992 | Byrne .......................... 439/215 |
| 5,683,831 A * | 11/1997 | Baril et al. .................... 429/96 |
| 6,607,401 B1 * | 8/2003 | Weaver et al. ............ 439/607.09 |
| 6,662,370 B1 | 12/2003 | Buchanan, Jr. |
| 6,938,276 B1 | 9/2005 | Prendergast |
| 7,049,027 B2 | 5/2006 | Buchanan, Jr. et al. |
| 7,094,089 B2 * | 8/2006 | Andre et al. ................. 439/218 |
| 7,164,262 B2 | 1/2007 | Zacay |
| 7,211,778 B1 | 5/2007 | Smith et al. |
| 7,311,526 B2 * | 12/2007 | Rohrbach et al. ............. 439/39 |
| 7,387,539 B2 * | 6/2008 | Trenne .......................... 439/660 |
| 7,591,657 B2 * | 9/2009 | Teicher ........................ 439/173 |
| 2007/0066111 A1 * | 3/2007 | Liang ........................... 439/217 |
| 2008/0227319 A1 * | 9/2008 | Lu ................................ 439/217 |

* cited by examiner

*Primary Examiner*—Gary F. Paumen
(74) *Attorney, Agent, or Firm*—RatnerPrestia (57) ABSTRACT

An electrical connector for a helmet-mounted night vision system including a receptacle assembly and a mating plug assembly. The receptacle assembly is configured to be mechanically coupled either directly or indirectly to a helmet and electrically coupled to a night vision device that is mounted to the helmet. The plug assembly is configured to be mechanically and electrically coupled to a battery pack. The plug assembly and the receptacle assembly are configured to be releasably mated together in at least two different orientations for releasably mounting the battery pack to the helmet and supplying power from the battery pack to a night vision device that is mounted to the helmet.

17 Claims, 11 Drawing Sheets

ELECTRICAL CONNECTOR FOR A HELMET-MOUNTED NIGHT VISION SYSTEM

TECHNICAL FIELD

This invention generally relates to a connector for electronic devices. More particularly, it relates to a connector that is suitable for a helmet-mounted night vision system.

BACKGROUND OF THE INVENTION

Hot-shoe connectors are commonly used to provide a mechanical means of attachment as well as an electrical connection between two devices. By way of example, many conventional cameras incorporate hot shoe connectors for mounting flash units thereto. A hot-shoe receptacle is located on the top side of a camera, and a hot-shoe plug is disposed on the bottom end of the flash unit for attaching the flash unit to the hot-shoe receptacle of the camera. In assembly, the hot-shoe plug on the flash unit is slidably inserted into the hot-shoe receptacle on the camera. The plug and receptacle may be secured together by a clamping screw that is provided on the flash, or other means. In the center of the hot-shoe receptacle on the camera is a metallic contact that interfaces with a metallic contact on the hot shoe plug of the flash unit. The camera delivers power to the flash unit via the interface between the metallic contacts. The physical dimensions of a standard hot-shoe connector for cameras are defined by the International Organization for Standardization ISO 518:2006.

Hot shoe style connectors have been incorporated into other electronic devices. For example, many helmet-mounted night vision devices incorporate hot shoe connectors. Helmet-mounted night vision devices are disclosed, for example, in U.S. Pat. Nos. 7,211,778, 7,049,027, 6,938,276, 6,662,370, and 5,683,831, 4,666,276, 4,329,735, for example, which are incorporated by reference herein in their entirety. In a helmet-mounted night vision device, a battery pack (or other power source) is connected to the helmet-mounted night vision system, via a shielded cable, to provide power to the night vision system. Such an arrangement is disclosed in U.S. Pat. No. 5,683,831.

In a helmet-mounted night vision device incorporating a hot shoe connector, a hot shoe receptacle of the removable battery pack is mounted to a hot-shoe plug provided on the rear or side of the helmet. Such an arrangement is disclosed in U.S. Pat. No. 5,683,831. Users often mount the battery pack to the helmet when the helmet is already fastened to the head. To connect the hot shoe receptacle to the hot shoe plug, the user brings the battery pack to the rear or the side of the helmet with one hand. The user then orients the hot shoe receptacle with respect to the hot shoe plug. By virtue of the design of the hot shoe plug and the hot shoe receptacle, the plug and the receptacle align together along a single orientation. Thus, the user must manipulate the battery pack and/or the helmet until the proper orientation is achieved. Once the plug and the receptacle are properly oriented, the user inserts the plug into the receptacle. A spring loaded lever or a pin that is provided on the battery pack snaps into a recess defined on the hot shoe plug thereby locking the battery pack to the helmet. To release the battery pack from the helmet, the user translates the spring loaded lever to release the plug from the receptacle. With the same hand or another hand, the user then removes the battery pack from the helmet.

The foregoing steps for mounting the battery pack onto the helmet may be perceived as difficult and inconvenient for some users, especially for those with limited dexterity. More particularly, manipulating the hot shoe connector is sometimes made difficult by the possibility that the user is blindly reaching to the side or rear of his or her head and manipulating the battery pack and/or the helmet until the proper orientation is achieved. These factors hinder the installation of battery packs onto the helmet, which can be problematic in a battle scenario.

In view of the foregoing, there is a continuing need to further develop and refine connectors for mechanically and electrically connecting two devices together, in the interests of performance, convenience, manufacturability and modularity.

SUMMARY OF THE INVENTION

A connector including a plug assembly and a receptacle assembly is disclosed. The plug assembly and the receptacle assembly mate together to form the connector. The connector may be used with any electronic device, such as imaging devices, night vision devices, cameras, for example.

According to one aspect of the invention, an electrical connector for a helmet-mounted night vision system including a receptacle assembly and a mating plug assembly is provided. The receptacle assembly is configured to be mechanically coupled either directly or indirectly to a helmet and electrically coupled to a night vision device that is mounted to the helmet. The plug assembly is configured to be mechanically and electrically coupled to a battery pack. The plug assembly and the receptacle assembly are configured to be releasably mated together in at least two different orientations for releasably mounting the battery pack to the helmet and supplying power from the battery pack to a night vision device that is mounted to the helmet.

According to another aspect of the invention, a helmet-mounted night vision assembly is provided. The helmet-mounted night vision assembly generally includes a helmet including provisions for mounting a night vision device thereto, and a battery pack that is configured to contain at least one battery. A receptacle assembly is mounted to the helmet and a plug assembly is mounted to the battery pack. The plug assembly and the receptacle assembly are configured to be releasably mated together in at least two different orientations for releasably mounting the battery pack to the helmet and supplying power from the battery of the battery pack to a night vision device that is mounted to the helmet.

In the above description, the terms 'plug' and 'receptacle' may be used interchangeably. Those terms are used to denote that separate assemblies are employed together form a connection.

These and other aspects of the present invention will become clear from the detailed discussion below when taken into consideration with the drawings. It is to be understood that the following discussion is intended merely to illustrate the preferred embodiment of the present invention. However, the present invention is not limited to the illustrated embodiments, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures.

DETAILED DESCRIPTION OF THE INVENTION

This invention will now be described with reference to several embodiments selected for illustration in the drawings. It will be appreciated that the scope and spirit of the invention are not limited to the illustrated embodiments.

As used herein, the term 'connector' refers to a device that provides an electrical connection between two elements, a mechanical connection between two elements, or both. The term 'connector' may also refer to a single component, such as a plug or a receptacle, for example, that is employed to mate with another component to establish a connection therebetween.

Figure 1:
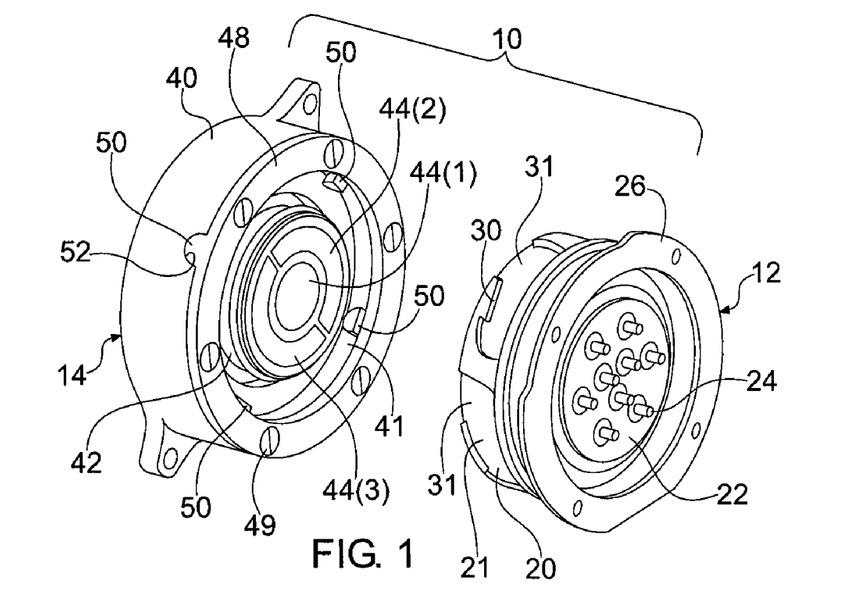
FIG. 1 depicts a perspective view of a connector including a plug assembly and a receptacle assembly, wherein the plug assembly is shown separated from the receptacle assembly, according to one exemplary embodiment of the invention.
Figure 2:
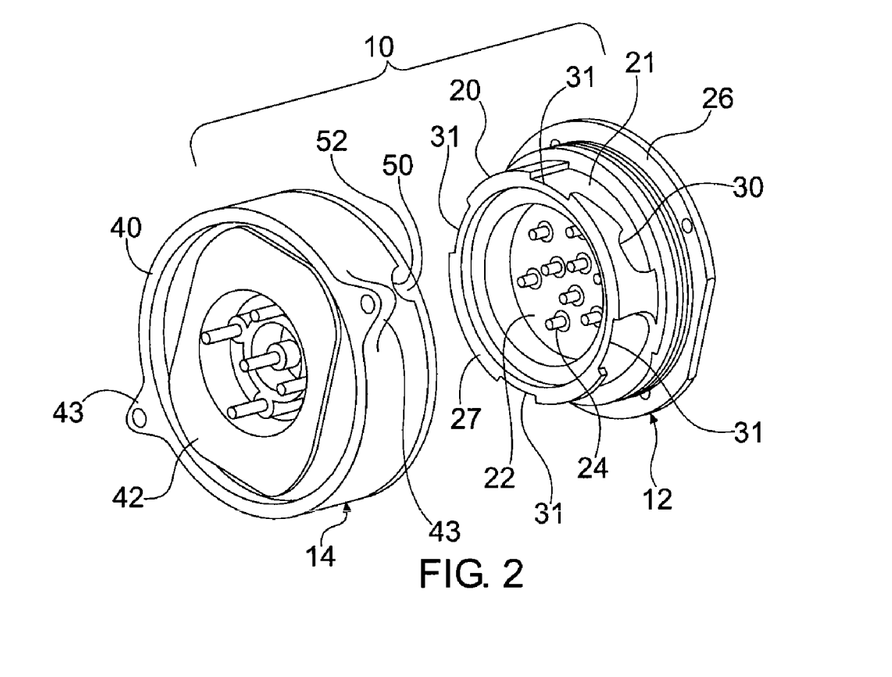
FIG. 2 depicts another perspective view of the connector of FIG. 1.
Figure 3:
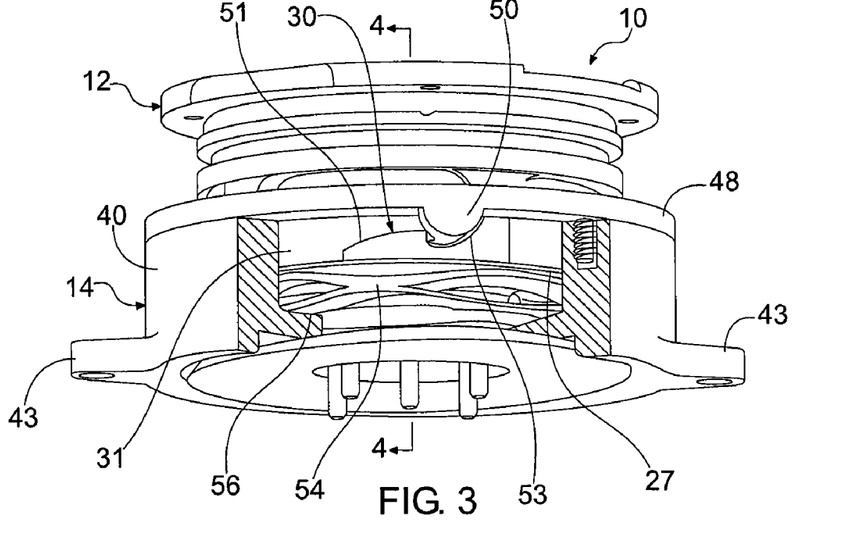
FIG. 3 depicts a perspective view of the connector of FIG. 1 shown in a mated configuration, wherein a portion of the receptacle assembly is cut-away to reveal engagement between the plug assembly and the receptacle assembly.
Figure 4:
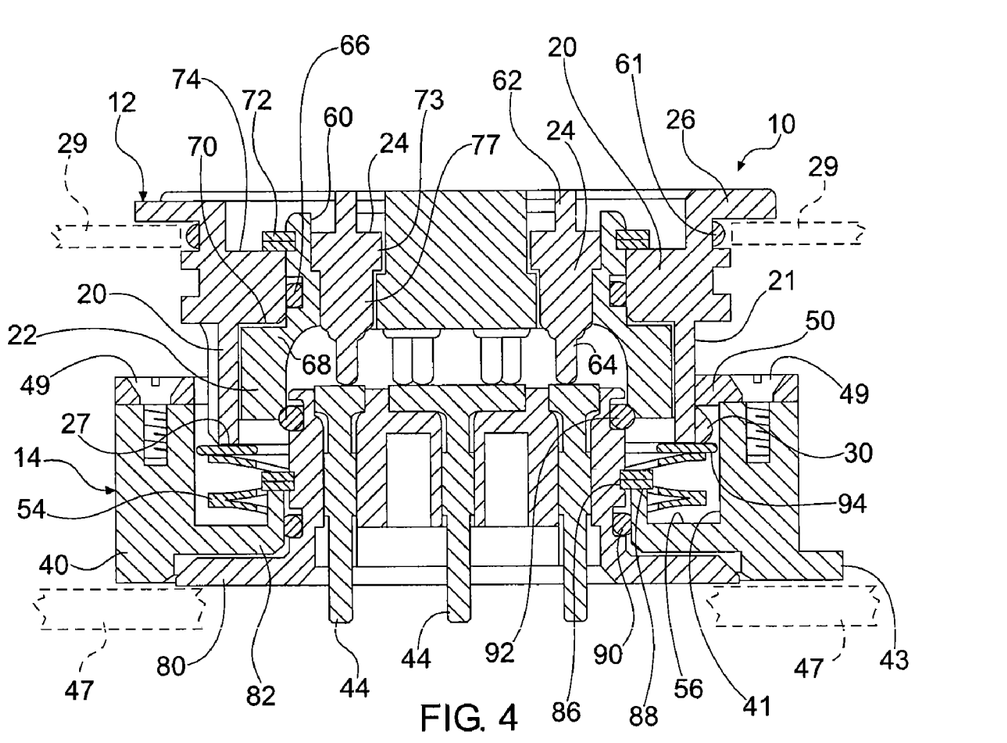
FIG. 4 depicts a cross-sectional side view of the mated connector of FIG. 3 taken along the lines 4-4.

FIGS. 1 and 2 depict perspective views of a connector 10, according to one exemplary embodiment of the invention. The connector 10 may be referred to herein as a rotary hot shoe connector or a roto-shoe connector. The connector 10 generally includes a plug assembly 12 and a receptacle assembly 14. The plug assembly 12 is shown separated from the receptacle assembly 14 in FIGS. 1 and 2. The plug assembly 12 and the receptacle assembly 14 are configured to mate together to form the connector 10 (as shown in FIGS. 3 and 4). The connector 10 is generally configured to mechanically and/or electrically join two devices together. By way of example, the connector 10 may join a battery pack to an electronic device, a cable to an electronic device, a cable to a battery pack, and so forth. One particular application of the connector 10 is illustrated in FIGS. 10-13.

The plug assembly 12 generally includes a substantially cylindrical body 20 defining a revolved surface 21, an insulator 22 retained within the body 20 and a series of electrical contacts 24 (9 shown) mounted within respective apertures defined in the insulator 22. A flange 26 radially extends from the body 20. A series of holes 28 are provided on the flange 26. Although not shown, a fastener may be inserted through each hole 28 for mounting the plug assembly 12 to a panel (such as panel 29 shown in FIG. 4). It should be understood that the panel 29 does not form part of the plug assembly 12.

Four cam surfaces 30 extend from the revolved surface 21 of the body 20. Each cam surface 30 extends circumferentially about the revolved surface 21 from a lower annular surface 27 of the body 20. According to the exemplary embodiment shown, each cam surface 30 extends outwardly from the revolved surface 21, i.e., away from the central axis of the body 20. Alternatively, the cam surfaces 30 may be recessed within the revolved surface 21.

The cam surfaces 30 are spaced about the circumference of the body 20. According to one aspect of the invention, the cam surfaces 30 are evenly spaced about the circumference of the body 20. According to this exemplary embodiment, the plug assembly 12 includes four cam surfaces 30. Those skilled in the art will understand from the description provided herein that the plug assembly 12 should include at least one cam surface 30 and may include any number of cam surfaces 30.

A passageway 31, provided in the form of a slot or an opening, is defined between adjacent cam surfaces 30. As described in greater detail with reference to the receptacle assembly 14, a series of protrusions 50 provided on the receptacle assembly 14 pass through respective passageways 31 to join the assemblies 12 and 14 together. Additionally, upon disengaging the plug assembly 12 from the receptacle assembly 14, the protrusions 50 provided on the receptacle assembly 14 are removed through the passageways 31.

According to this exemplary embodiment, the plug assembly 12 includes four passageways 31 (see FIG. 2). Providing multiple passageways 31 enables an end-user to join the assemblies 12 and 14 at multiple orientations. More specifically, upon mating the assemblies 12 and 14, any protrusion 50 of the receptacle assembly 14 can enter through any passageway 31 of the plug assembly 12. Providing multiple locations for joining the plug assembly 12 with the receptacle assembly 14, or vice versa, simplifies the end-user's task of assembling those components together. As will be described in greater detail with reference to FIG. 6, the electrical contacts 24 and 44 of the assemblies 12 and 14 are arranged such that the assemblies 12 and 14 may be joined at any one of the multiple engagement points.

Figure 6:
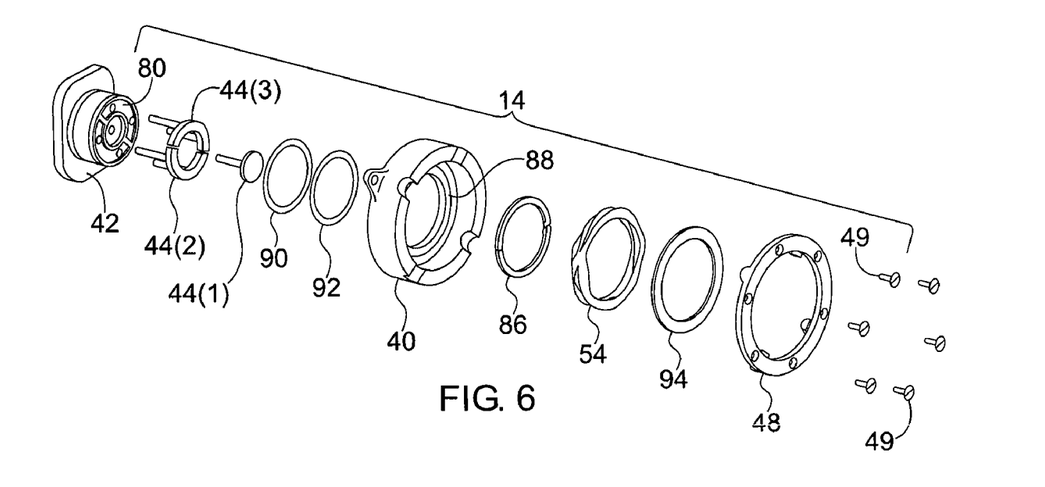
FIG. 6 depicts an exploded view of the receptacle assembly of FIG. 1.

The receptacle assembly 14 generally includes a substantially cylindrical body 40 defining a revolved surface 41, an insulator 42 retained within the body 40, and three electrical contacts 44(1)-44(3) mounted within respective apertures defined in the insulator 42. The electrical contacts 44(1)-44(3) (referred to collectively as electrical contacts 44) are best illustrated in FIG. 6. Two bosses 43 extend from the lower end of the body 40. Each boss 43 includes a hole, and, although not shown, a fastener may be inserted through a respective hole of a boss 43 for mounting to a panel (see panel 47 shown in FIG. 4).

A ring 48 is mounted to the top end of the body 40. Alternatively, the ring 48 may be integral with the body 40. Four semi-circular protrusions 50 extend from the interior annular surface of the ring 48 toward the central axis of the body 40. Each protrusion 50 is configured to bear against a cam surface 30 of the plug assembly 12, as described in greater detail with respect to FIGS. 7A-7F. Each protrusion 50 extends from the lower surface of the ring 48 and is at least partially positioned within a recess 52 defined on the top surface of the body 40.

Figure 8A:
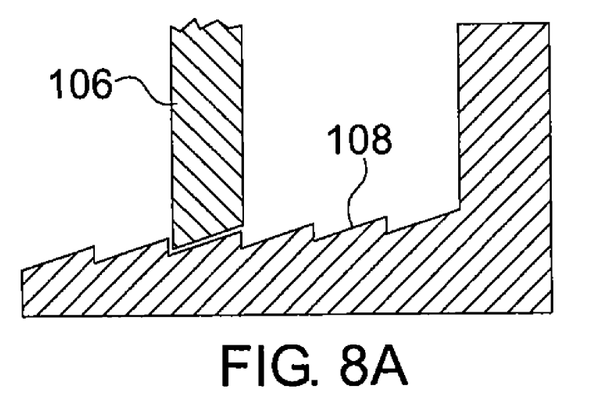
FIG. 8A depicts a schematic view of a protrusion mated with a cam surface, according to another exemplary embodiment of the invention.

The protrusions 50 may be semi-circular, as shown, circular, polygonal (as shown in FIG. 8A), square, rectangular or any other shape. As will be described in greater detail with reference to FIG. 8A, the protrusions 50 are sized and shaped to complement the shape of the cam surfaces 30 of the plug assembly 12. The protrusions 50 may be integrally formed with the ring 48, or, alternatively, the protrusions 50 may be provided in the form of pins or fasteners that are mounted to the ring 48 or the body 40.

The protrusions 50 are spaced apart about the circumference of the body 40. Moreover, according to one aspect of the invention, the protrusions 50 are evenly spaced apart about the circumference of the body 40. The radial distance separating adjacent protrusions 50 may be substantially equal to the radial distance separating adjacent cam surfaces 30 of the plug assembly 12 (as shown in FIGS. 1 and 2).

According to this exemplary embodiment, the receptacle assembly 14 includes four protrusions 50. Those skilled in the art will understand from the description herein that the receptacle assembly 14 should include at least one protrusion 50 and may include any number protrusions 50. The number of protrusions 50 may be equal to the number of cam surfaces 30 or may vary.

FIG. 3 depicts a perspective view of the connector 10 of FIG. 1 shown in a mated configuration, wherein a portion of the body 40 of the receptacle assembly 14 is cut-away to reveal engagement between the plug assembly 12 and the receptacle assembly 14. As shown in FIG. 3, the cam surface 30 of the plug assembly 12 is defined by a curvilinear surface 51 that leads into a semi-circular recess 53. One of the protrusions 50 of the receptacle assembly 14 is retained within a recess 53 of a cam surface 30 of the plug assembly 12. Although not shown, all of the protrusions 50 may be retained in a respective recess 53 simultaneously.

FIG. 4 depicts a cross-sectional side view of the mated connector 10 of FIG. 3 taken along the lines 4-4. As best shown in FIG. 4, the revolved surfaces 21 and 41 of the assemblies 12 and 14 are positioned to face each other. A spring 54 is positioned between the lower annular surface 27 of the plug assembly 12 and a lower interior surface 56 of the body 40 to bias the cam surface 30 against the protrusion 50, as shown. The spring 54 maintains a load interface between the protrusion 50 and the cam surface 30, such that the rotational and axial positions of the assemblies 12 and 14 are generally fixed and "play" between the assemblies 12 and 14 is substantially reduced or eliminated entirely.

Figure 5:
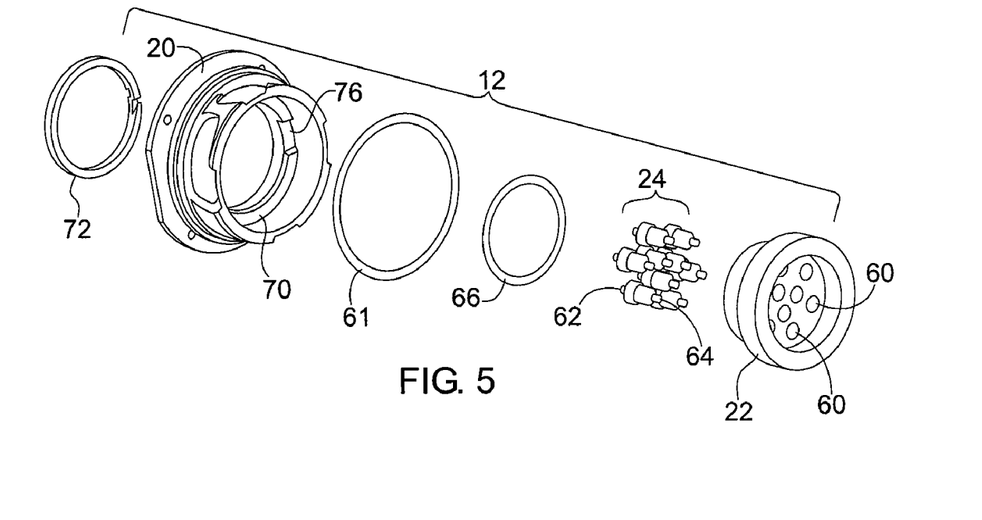
FIG. 5 depicts an exploded view of the plug assembly of FIG. 1.

FIGS. 5 and 6 depict exploded views of the assemblies 12 and 14, respectively. Referring now to FIGS. 4-6, the plug assembly 12 generally comprises a body 20, an insulator 22 that is mounted to the body 20 and a series of electrical contacts 24 mounted to the insulator 22. The panel 29 of a first electronic device (not shown) is mounted to the flange 26 of the plug assembly 12. An o-ring 61 is positioned in an annular recess formed in the body 20 at an interface between the body 20 and the panel 29.

The insulator 22 is fixedly mounted to the body 20. More particularly, a shoulder portion 68 of the insulator 22 bears against a shoulder portion 70 of the body 20. A retaining ring 72 is positioned within a recess defined in the insulator 20 and is positioned to bear on the surface 74 of the body 20. The retaining ring 72 and the shoulder 68 of the insulator 22 lock the insulator 22 in a fixed vertical position. Although not explicitly shown, a protrusion extends from the insulator 22 to engage a slot 76 (see FIG. 5) formed in the body 20 to retain the insulator 22 in a fixed rotational position with respect to the body 20. An o-ring 66 is positioned within a groove formed in the insulator 22 at the interface between the insulator 22 and the body 20. The o-ring 66 limits the ingress of contaminants (such as water) at the interface between the body 20 and the insulator 22.

The electrical contacts 24 are press fit, or otherwise mounted, through holes 60 defined in the insulator 22. Each hole 60 includes a large diameter portion for accommodating a large diameter portion 73 of the electrical contact 24 and a smaller diameter portion for accommodating a relatively smaller diameter portion 77 of the electrical contact 24. As described in greater detail with respect to FIGS. 7A-7F, the electrical contacts 24 are resiliently deformable under an applied load and return to their original shape in the absence of an applied load. A resilient member (not shown) is positioned within the large diameter portion 73 of each electrical contact 24. Suitable electrical contacts (both resilient and non-resilient) are manufactured and distributed by the Mill-Max Corporation of Oyster Bay, N.Y., USA. According to another exemplary embodiment not illustrated herein, the electrical contacts 44 are resiliently deformable.

Figure 10:
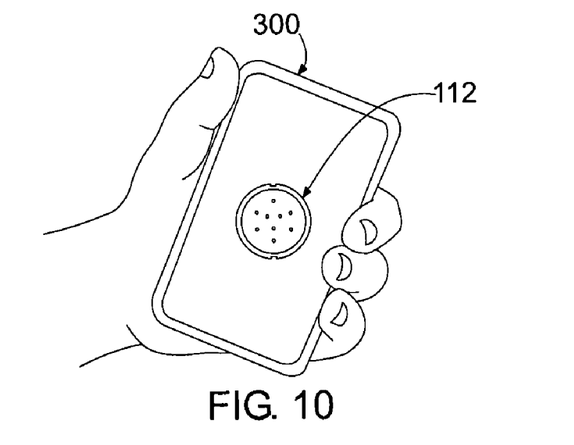
FIG. 10 depicts the plug assembly of FIG. 9B mounted to a battery pack of a night vision system, wherein the battery pack is shown grasped by an end-user's hand.

As best shown in FIG. 4, in a mated configuration of the connector 10, the electrical contacts 24 of the plug assembly 12 are positioned in direct, physical contact with the electrical contacts 44 of the receptacle assembly 14 for distributing power and signal(s) between the assemblies 12 and 14 of the connector 10. Specifically, the end 64 of each contact 24 bears on a conductive surface of electrical contact 44 of the receptacle assembly 14. The opposing end 62 of each contact 24 may be mounted to a printed circuit board, a cable, a wire, or a flex circuit, for example, that is connected to a first electronic device (not shown). The first electronic device may be a battery pack, for example (as shown in FIG. 10).

Referring still to FIGS. 4-6, the receptacle assembly 14 generally includes a body 40, an insulator 42 mounted within the body 40, and five electrical contacts 44 mounted within the insulator 42. The body 40 includes two bosses 43 (one shown), each including a hole defined therethrough. Although not shown, a fastener may be inserted through the hole of the boss 43 to mount the body 40 to the panel 47 of a second electronic device. The second electronic device may be, for example, a night vision device or a cable extending from a night vision device.

The ring 48 is fixedly mounted to the top end of the body 40. A series of flush-mounted fasteners 49 are provided for mounting the ring 48 to the top end of the body 40. Although not shown, the ring 48 may be integrated with body 40 to reduce the number of components of the receptacle assembly 14.

The insulator 42 is fixedly mounted to the body 40. More particularly, a shoulder portion 80 of the insulator 42 bears against a shoulder portion 82 of the body 40. A retaining ring 86 is positioned within a recess defined in the insulator 42 and is positioned to bear on the surface 88 of the body 20. The retaining ring 86 and the shoulder 80 of the insulator 42 lock the insulator 42 in a fixed vertical position. Although not explicitly shown, a protrusion extends from the underside of the insulator 42 to engage a slot formed in the body 40 to retain the insulator 42 in a fixed rotational position with respect to the body 40.

An o-ring 90 is positioned within a groove formed in the insulator 42 at the interface between the insulator 42 and the body 40. The o-ring 90 limits the ingress of contaminants (such as water) at the interface between the body 40 and the insulator 42. Another o-ring 92 is positioned within a groove formed in the insulator 42 at the interface between the insulator 42 and the insulator 22 of the plug assembly 12. The o-ring 92 limits the ingress of contaminants (such as water) at the interface between the assemblies 12 and 14. The o-ring 92 provides a simple, easily controlled, and robust means of keeping fluid and debris out of the electrical interface.

A spring 54 is positioned on the lower interior surface 56 of the receptacle assembly 14. A thrust bearing 94, in the form of a metallic ring, is positioned against the spring 54. The thrust bearing 94 is sandwiched between the spring 54 and the insulator 22 of the plug assembly 12. The spring 54 and the thrust bearing 56 are captivated within the receptacle assembly 14 between the lower interior surface 56 and the protrusions 50. As mentioned previously, the spring 54 biases the cam surface 30 of the plug assembly 12 against the protrusion 50 of the receptacle assembly 14, as shown.

The ring 48, the body 20 of the plug assembly 12 and the body 40 of the receptacle assembly 14 may be formed from a metallic material, a polymer, or any other desirable material. Those components may be formed by a molding or a machining operation, for example. The insulators 22 and 42 of the assemblies may be formed from a dielectric material by a molding or a machining operation, for example.

Figure 7A:
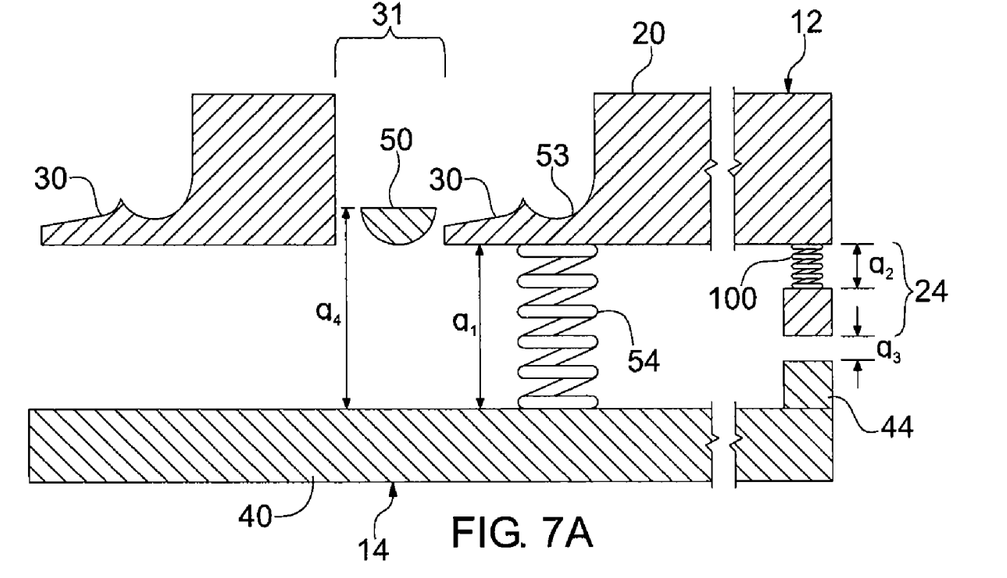
FIGS. 7A-7D schematically depict the process of engaging the plug assembly with the receptacle assembly.
Figure 7B:
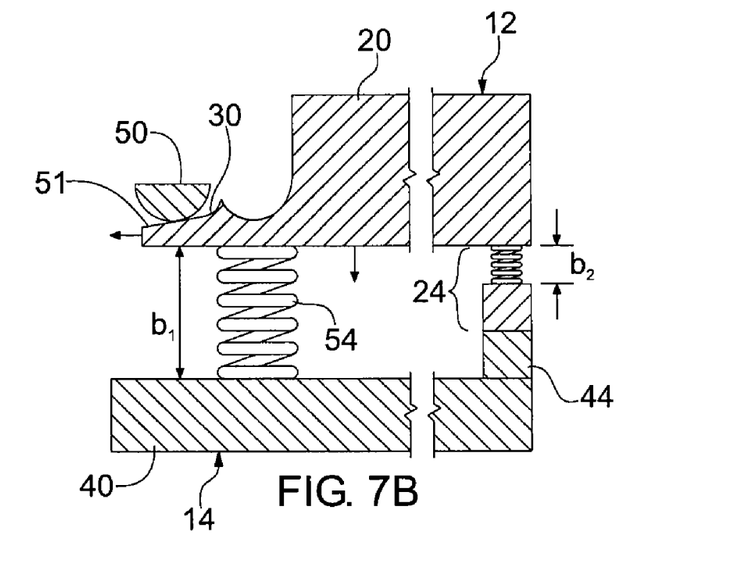
Figure 7C:
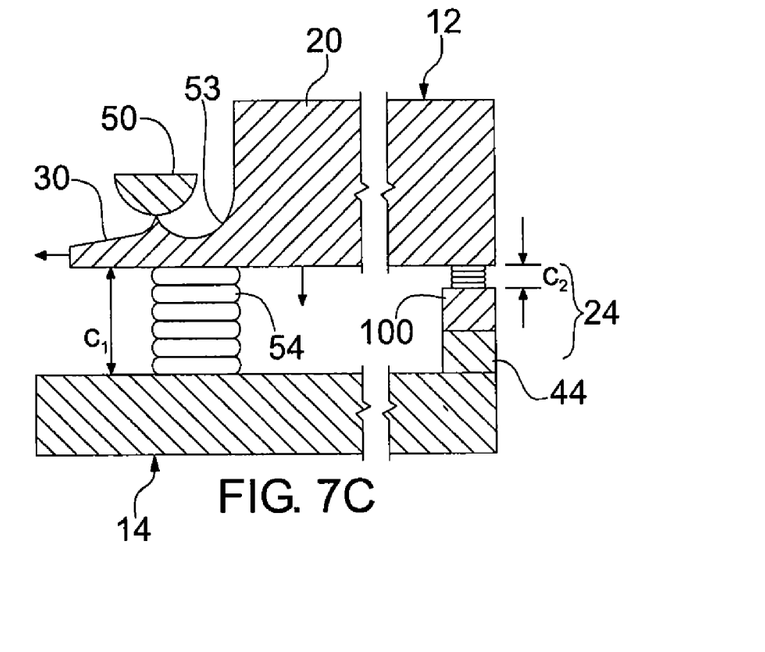
Figure 7D:
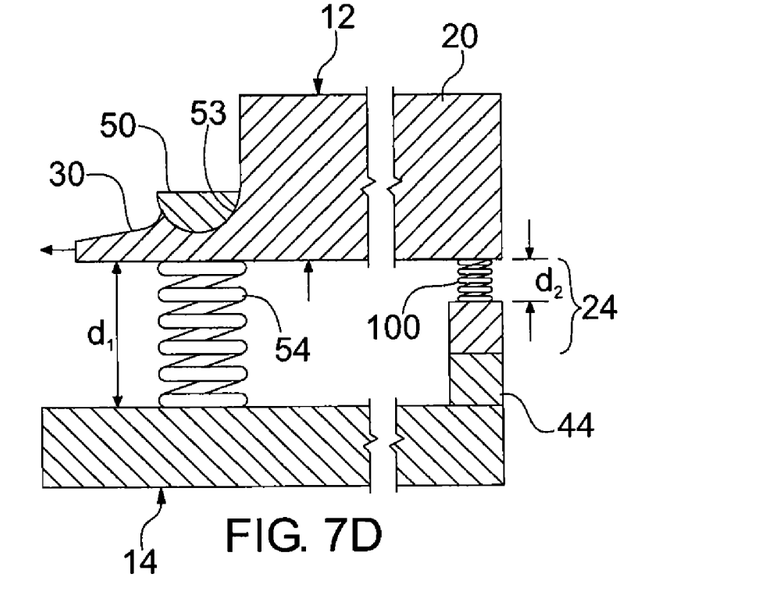
Figure 7E:
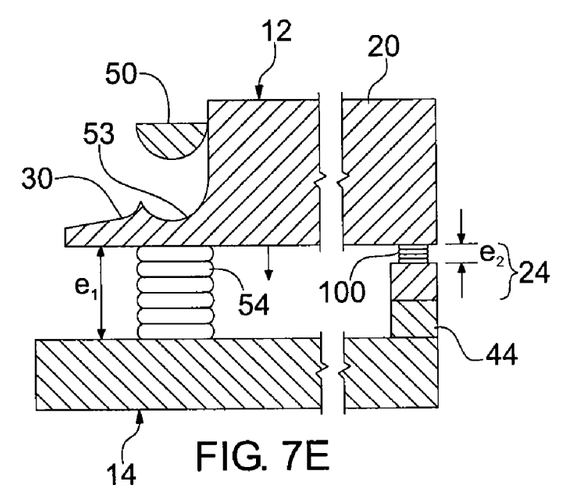
FIGS. 7E and 7F schematically depict the process of disengaging the plug assembly from the receptacle assembly.
Figure 7F:
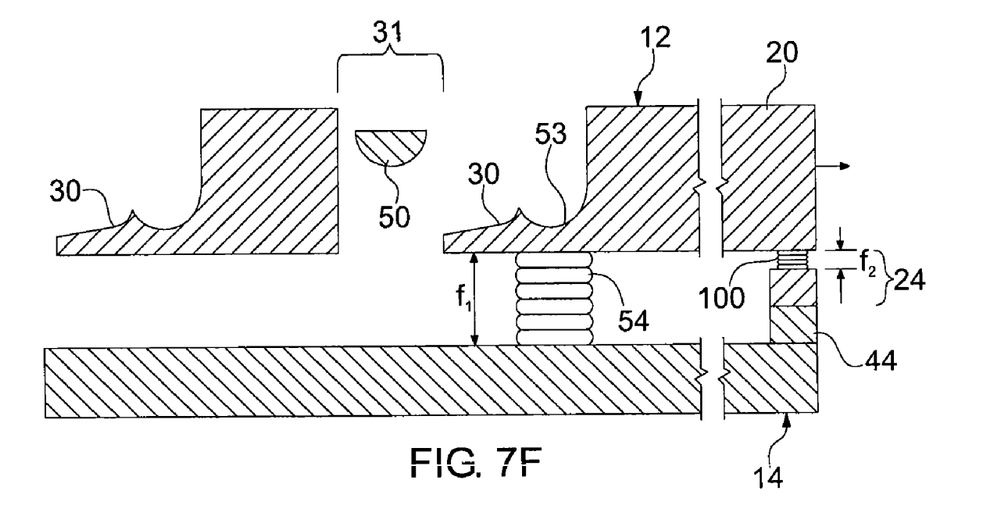

FIGS. 7A-7D schematically depict the process of engaging the assemblies 12 and 14, and FIGS. 7E and 7F schematically depict the process of disengaging the assemblies 12 and 14. It should be understood that all of the components of connector 10 are shown schematically in FIGS. 7A-7F. In the schematic depiction, the plug assembly 12 includes the body 20, which defines the cam surface 30, and the electrical contact 24, as denoted by the similar cross-section hatching. The electrical contact 24 includes an integral resilient member 100, referred to hereinafter as spring 100.

In the schematic depiction, the receptacle assembly 14 includes the body 40, a protrusion 50 fixedly mounted with respect to the body 40 and one electrical contact 44, as denoted by the similar cross-section hatching. It should be understood that position of the protrusion 50 with respect to the body 40 of the receptacle assembly 14 is fixed. Accordingly, the vertical gap $a_4$ between the body 40 of the receptacle assembly 14 and the protrusion 50 remains constant throughout the schematic depictions of FIGS. 7A-7F.

To facilitate explanation of FIGS. 7A-7F, rotational and translational motion of the plug assembly 12 with respect to the receptacle assembly 14 is described. It should be understood, however, that motion of the receptacle assembly 14 with respect to the plug assembly 12 would produce substantially the same result. Moreover, the receptacle assembly 14 and the plug assembly 12 may be moved with respect to each other simultaneously.

Referring now the individual figures, FIG. 7A depicts a starting position of the assemblies 12 and 14. In FIG. 7A the assemblies 12 and 14 are shown joined together, but not mechanically or electrically connected. The protrusion 50 of the receptacle assembly 14 is positioned in a passageway 31 between adjacent the cam surface 30 of the plug assembly 12. The spring 54 is maintained in a relaxed stated having a free-state length $a_1$. The spring 100 of the electrical contact 24 is also maintained in a relaxed state having a free-state length $a_2$. The electrical contacts 24 and 44 of the assemblies 12 and 14, respectively, are separated by a gap $a_3$, thus, no electrical connectivity can exist between the assemblies 12 and 14.

FIG. 7B depicts a schematic view of the assemblies 12 and 14 engaged with each other. The protrusion 50 of the receptacle assembly 14 is positioned on the curvilinear surface 51 of the cam surface 30 of the plug assembly 12. To move the plug assembly 12 from the disengaged position in FIG. 7A to the engaged position in FIG. 7B, an end-user translates the plug assembly 12 downward (see vertical arrow) against the force of the springs 54 and 100 and rotates the plug assembly 12 in a clockwise direction (see horizontal arrow). In the arrangement shown in FIG. 7B, the spring 54 has a compressed length $b_1$, which is less than the free-state length $a_1$ of the spring 54 shown in FIG. 7A. The spring 100 of the contact 24 has a compressed length $b_2$, which is less than the free-state length $a_2$ of the spring 100 shown in FIG. 7A. The electrical contact 24 bears on the electrical contact 44, establishing electrical connectivity between the assemblies 12 and 14.

FIG. 7C depicts a schematic view of the protrusion 50 of the receptacle assembly 14 further advanced along the cam surface 30 of the plug assembly 12. To move the plug assembly 12 from the position in FIG. 7B to the position in FIG. 7C, an end-user rotates the plug assembly 12 in the clockwise direction (see horizontal arrow). As the plug assembly 12 rotates in the clockwise direction and the cam surface 30 translates along the protrusion 50 (or vice versa), the protrusion 50 urges the body 20 of the plug assembly 12 in the downward direction against the force of the springs 54 and 100. The spring 54 has a compressed length $c_1$, which is less than the compressed length $b_1$ of FIG. 7B. The spring 100 of the contact 24 has a compressed length $c_2$, which is less than the compressed length $b_2$ of FIG. 7B.

FIG. 7D depicts a schematic view of the protrusion 50 of the receptacle assembly 14 further advanced along the cam surface 30 of the plug assembly 12. In FIG. 7D the assemblies 12 and 14 are in a locked configuration, whereby both an electrical and mechanical connection are established between the assemblies 12 and 14. To move the plug assembly 12 from the position in FIG. 7C to the engaged position in FIG. 7D, an end-user rotates the plug assembly 12 further in the clockwise direction (see horizontal arrow). As the plug assembly 12 rotates in the clockwise direction and the cam surface 30 translates along the protrusion 50, the springs 54 and 100 urge the body 20 of the plug assembly 12 upwards (see arrow) to seat the protrusion 50 within the recess 53 of the cam surface 30 of the plug assembly 12. The walls of the recess 53 limit rotation of both the plug assembly 12 and the receptacle assembly 14. In FIG. 7D, the spring 54 has a compressed length $d_1$, which is greater than the compressed length $c_1$ of FIG. 7C. The spring 100 of the contact 24 has a compressed length $d_2$, which is less than the compressed length $c_2$ of the spring 100 shown in FIG. 7C.

FIG. 7E depicts a schematic view of the plug assembly 12 mechanically disengaged from the receptacle assembly 14. More particularly, in FIG. 7E, the cam surface 30 of the plug assembly 12 is physically separated from the protrusion 50 of the receptacle assembly 14. To move the plug assembly 12 from the position in FIG. 7D to the position in FIG. 7E, an end-user translates the body 20 of the plug assembly 12 downward (see vertical arrow) against the force of the springs 54 and 100 until the cam surface 30 of the plug assembly 12 is physically separated from the protrusion 50 of the receptacle assembly 14.

In FIG. 7E, the spring 54 has a compressed length $e_1$, which is less than its relaxed length $d_1$ in FIG. 7D. The spring 100 of the contact 24 has a compressed length $e_2$, which is less than the relaxed length $d_2$ of the spring 100 shown in FIG. 7D. While the plug assembly 12 and the receptacle assembly 14 are mechanically disengaged in FIG. 7E, those assemblies are still in electrical contact by virtue of the physical contact between the electrical contacts 24 and 44.

FIG. 7F depicts a schematic view of the plug assembly 12 rotated with respect to the receptacle assembly 14. To move the plug assembly 12 from the position in FIG. 7E to the position in FIG. 7F, an end-user rotates the body 20 of the plug assembly 12 in the counterclockwise direction (see horizontal arrow) while the body 20 is still retained in the downward position against the force of the springs 54 and 100. The plug assembly 12 is rotated to a position where the protrusion 50 is aligned with the passageway 31 of the plug assembly 12.

In FIG. 7F, the spring 54 has a compressed length $f_1$, which is substantially the same as compressed length $e_1$ in FIG. 7E. Additionally, the spring 100 of the contact 24 has a compressed length $f_2$, which is substantially the same as compressed length $e_1$ in FIG. 7E. The assemblies 12 and 14 are still in electrical contact by virtue of the physical contact between the electrical contacts 24 and 44.

Upon releasing the body 20 of the plug assembly 12 from its position in FIG. 7F, the plug assembly 12 and the receptacle assembly 14 return to their starting positions depicted in FIG. 7A, whereby the assemblies 12 and 14 are both mechanically and electrically disengaged. More specifically, the protrusion 50 returns to its initial position within the passageway 31 of the plug assembly 12. The spring 54 returns to its relaxed stated having a free-state length $a_1$ and the spring 100 of the electrical contact 24 also returns to its relaxed state having a free-state length $a_2$. The electrical contacts 24 and 44 of the assemblies 12 and 14, respectively, return to their initial position separated by a gap $a_3$.

In the exemplary embodiment of the connector 10 illustrated in FIGS. 1 through 7F the cam surfaces 30 are defined on the plug assembly 12 and the protrusions 50 are defined on the receptacle assembly 14. Those skilled in the art will understand that the cam surface 30 may be defined on the receptacle assembly 14 and the protrusions 50 may be defined on the plug assembly 12, to achieve substantially the same results described herein. Additionally, the resilient electrical contacts may be provided on the receptacle assembly 14 to achieve substantially the same results described herein.

FIG. 8A depicts a schematic view of a protrusion 106 engaged with a cam surface 108, according to another exemplary embodiment of the invention. According to this exemplary embodiment, the cam surface 108 is provided in the form of a stepped surface and the protrusion 106 has a polygonal cross-section. As the stepped cam surface 108 moves horizontally to the left or the protrusion 106 moves horizontally to the right, the protrusion 106 slides along the stepped cam surface 108. Engagement between the protrusion 106 and the stepped cam surface 108, however, limits horizontal movement of the stepped cam surface 108 to the right and horizontal movement of the protrusion 106 to the left. The protrusion 106 may take any form so long as it includes a pointed surface for engaging the steps of the cam surface 108. To disengage the protrusion 106 from the cam surface 108, the cam surface 108 must be translated in the downward direction, similar to the disengagement step shown in FIG. 7E.

Figure 8B:
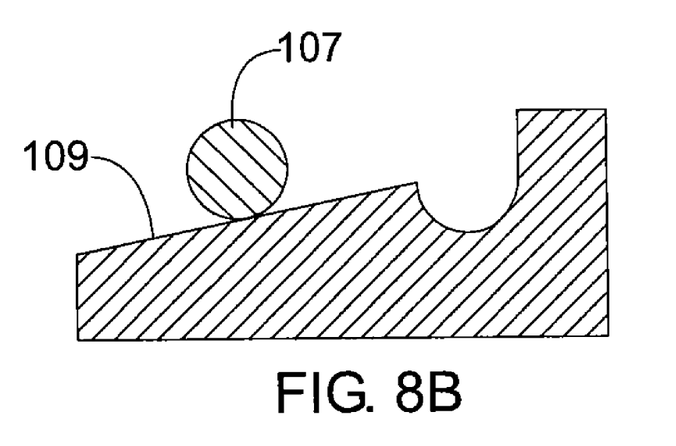
FIG. 8B depicts a schematic view of a protrusion mated with a cam surface, according to yet another exemplary embodiment of the invention.

FIG. 8B depicts a schematic view of a protrusion 107 having a circular cross-section positioned on a cam surface 109, according to another exemplary embodiment of the invention. The cam surface 109 is similar to the cam surface 30 shown in FIGS. 1-7F, with the exception that the cam surface 109 of FIG. 8B includes a portion having a constant slope instead of a curvilinear shape. The cam surface may also be toothed or jagged, for example. Those skilled in the art will understand from the description herein that other geometries of the cam surfaces and the protrusions may also be useful to achieve substantially the same result as described in FIGS. 7A-7F.

Figure 9A:
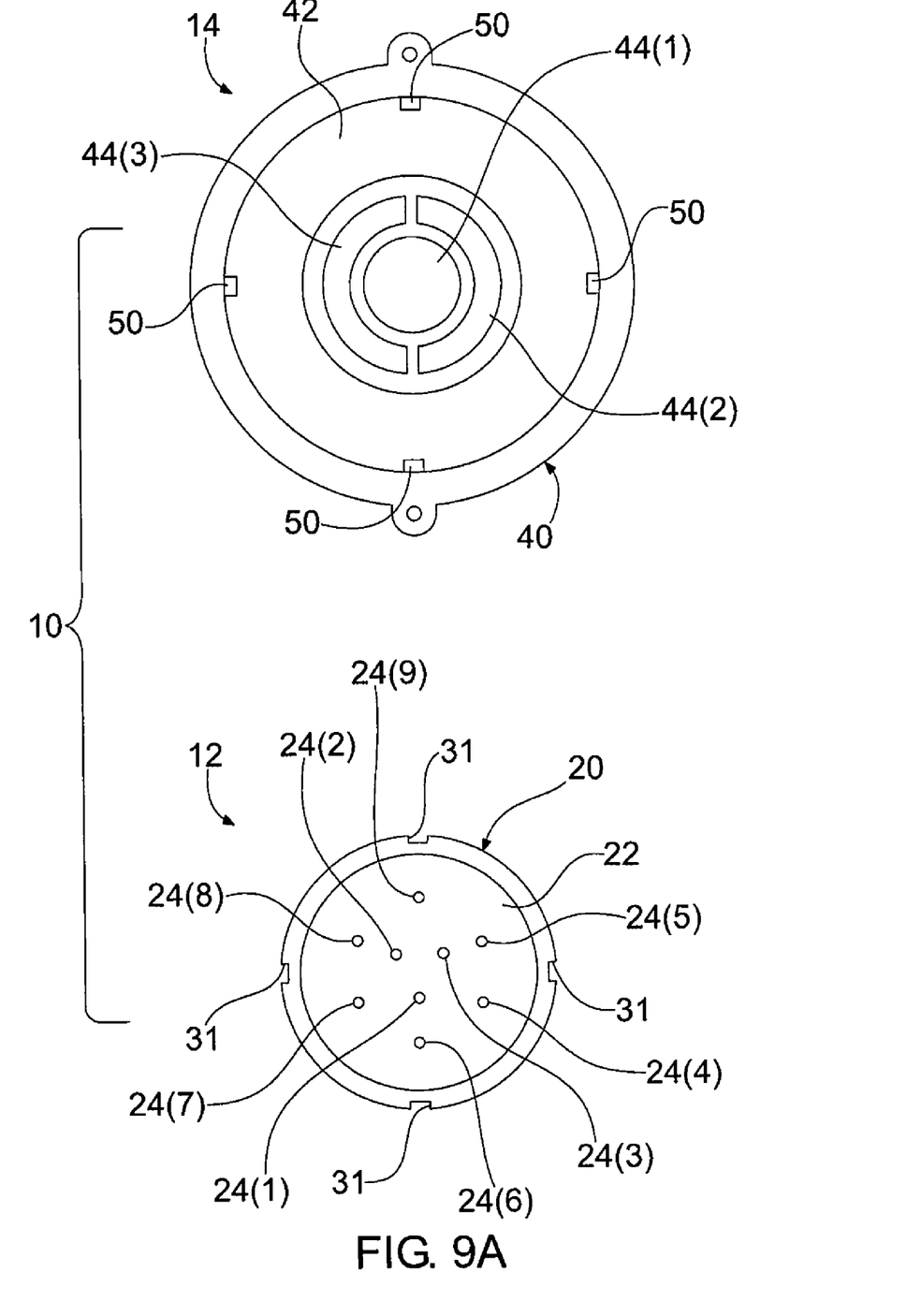
FIG. 9A depicts a schematic top plan view of a simplified version of the plug assembly and the receptacle assembly.

FIG. 9A depicts a schematic top plan view of a simplified version of the plug assembly 12 and the receptacle assembly 14 of the connector 10. As described previously, the receptacle assembly 14 includes four protrusions 50 and the plug assembly 12 includes four passageways 31, whereby each passageway 31 leads into a cam surface 30. To join the assemblies 12 and 14 together, a protrusion 50 of the receptacle assembly 14 is inserted through a respective passageway 31 of the plug assembly 12 (or vice versa). According to one aspect of the invention, any one of the protrusions 50 may be inserted through any one of the passageways 31 to engage the assemblies 12 and 14. Because the plug assembly 12 includes four passageways 31, the plug assembly 12 may be joined with the receptacle assembly 14 (or vice versa) in four different radial orientations. Each orientation is separated by approximately 90 degrees. Either assembly 12 or assembly 14 is turned less than ¼ of a revolution with respect to the other to mate and seal the assemblies 12 and 14 together. Those skilled in the art will understand that the number of passageways 31 may vary to increase or reduce the number of orientations.

The receptacle assembly 14 includes two rows of concentrically located electrical contacts 44. The interior row includes the contact 44(1) and the exterior row includes the contacts 44(2) and 44(3). The contact 44(1) is positioned along the central axis of the receptacle assembly 14. The contacts 44(2) and 44(3) are concentrically positioned about the contact 44(1). While the receptacle assembly 14 includes two rows of electrical contacts, those skilled in the art will understand from the description herein that the receptacle assembly 14 may include any number of concentrically located electrical contacts 44.

The plug assembly 12 includes nine contacts 24(1) through 24(9) that are all positioned relative to the central axis of the plug assembly 12. The contacts 24(1), 24(2) and 24(3) are positioned proximal to the central axis of the plug assembly 12, whereas the contacts 24(4) through 24(9) are positioned distal to the central axis. The contacts 24(4) through 24(9) are positioned substantially equidistant to the central axis. Those skilled in the art will understand from the description herein that the plug assembly 12 may have any number of electrical contacts.

Regardless of the relative radial orientations of the assemblies 12 and 14, the contacts 24(1), 24(2) and 24(3) of the plug assembly are always positioned to engage the contact 44(1) of the receptacle assembly 14 to transfer power, ground or signals therebetween. Depending upon the relative radial orientations of the assemblies 12 and 14, however, the contacts 24(4) through 24(9) may be positioned to engage either contact 44(2) or contact 44(3) to transfer power, ground or signals therebetween.

Figure 9B:
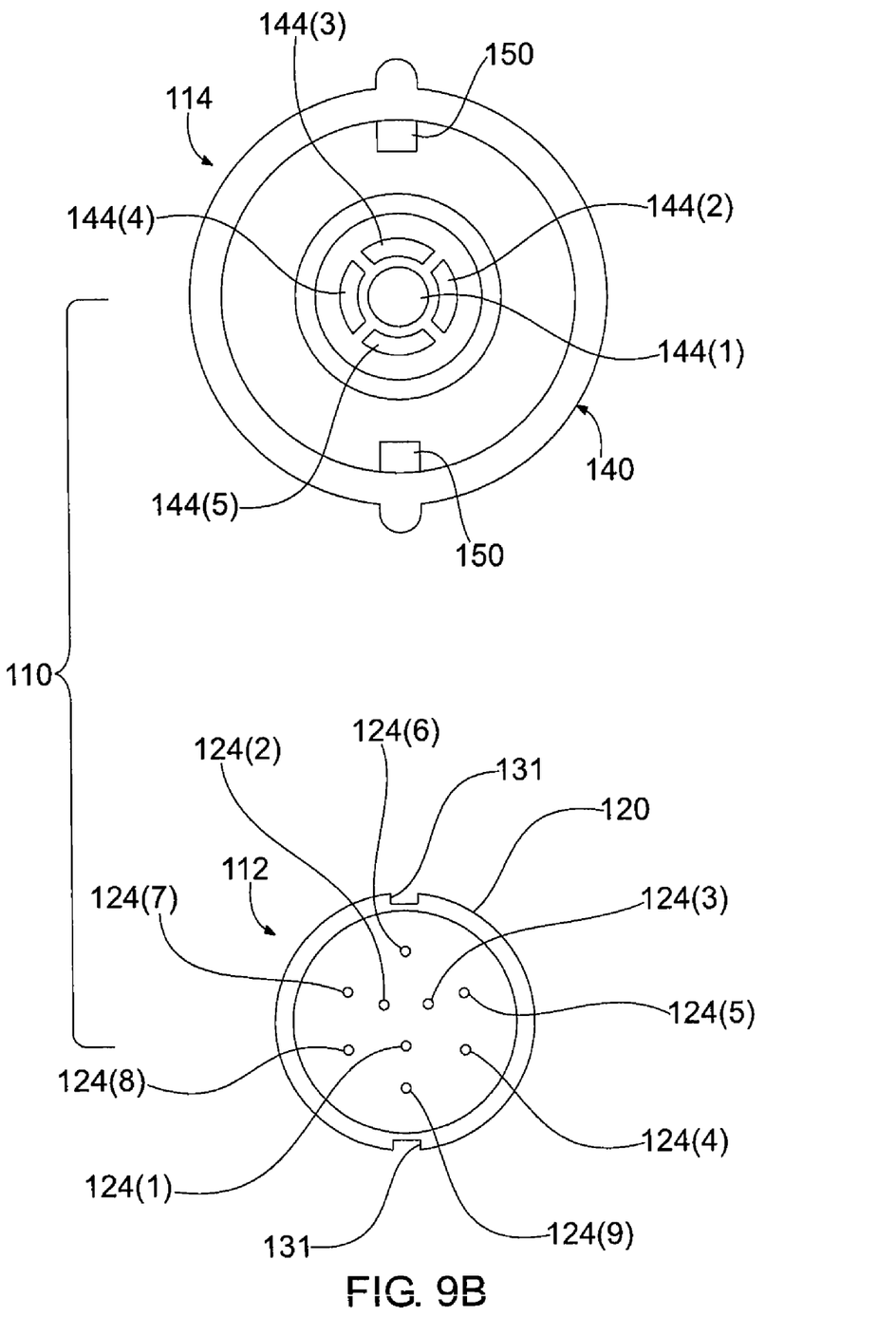
FIG. 9B depicts a schematic top plan view of a simplified version of a plug assembly and a receptacle assembly, according to another exemplary embodiment of the invention.

FIG. 9B depicts a schematic top plan view of a simplified version of a plug assembly 112 and a receptacle assembly 114 of a connector 110, according to another exemplary embodiment of the invention. The assemblies 112 and 114 are substantially similar to assemblies 12 and 14, with three exceptions: (a) the receptacle assembly 114 includes five electrical contacts 144, (b) two passageways 131 are formed on the body 120 of the plug assembly 112, and (c) two protrusions 150 extend from the body 140 of the receptacle assembly 114. The arrangement of the electrical contacts 124(1) through 124(9) does not differ from that of the plug assembly 12.

The plug assembly 112 includes two passageways 131 that are radially separated by approximately 180 degrees.

Although not shown, the plug assembly 112 includes two cam surfaces, wherein each cam surface extends from a passageway 131. The plug assembly 112 may be joined with the receptacle assembly 114 (or vice versa) in two different radial orientations, each separated by approximately 180 degrees. In use, either assembly 112 or assembly 114 is turned less than ½ of a revolution with respect to the other to mate and seal the assemblies 112 and 114 together.

Regardless of the relative radial orientations of the assemblies 112 and 114, the contacts 124(1), 124(2) and 124(3) of the plug assembly 112 are always positioned to engage the contact 144(1) of the receptacle assembly 114. In a first orientation of the assemblies 112 and 114, the contacts 124(4) and 124(5) of the plug assembly 112 are positioned to engage the contact 144(4) of the receptacle assembly 114, the contact 124(6) of the plug assembly 112 is positioned to engage the contact 144(3) of the receptacle assembly 114, the contacts 124(7) and 124(8) of the plug assembly 112 are positioned to engage the contact 144(2) of the receptacle assembly 114, and the contact 124(9) of the plug assembly 112 is positioned to engage the contact 144(5) of the receptacle assembly 114. In a second orientation of the assemblies 112 and 114, the contacts 124(4) and 124(5) of the plug assembly 112 are positioned to engage the contact 144(2) of the receptacle assembly 114, the contact 124(6) of the plug assembly 112 is positioned to engage the contact 144(5) of the receptacle assembly 114, the contacts 124(7) and 124(8) of the plug assembly 112 are positioned to engage the contact 144(4) of the receptacle assembly 114, and the contact 124(9) of the plug assembly 112 is positioned to engage the contact 144(3) of the receptacle assembly 114. It should be understood that the first orientation is radially separated from the second orientation by approximately 180 degrees.

According to one exemplary use of the invention, power is transmitted through the contacts 124(1), 124(2) and 124(3); signals are transmitted to the contacts 124(6) and 124(9); and contacts 124(4), 124(5), 124(7) and 124(8) of the plug assembly 112 are connected to a ground potential. Regardless of the relative radial orientation of the assemblies 112 and 114, power is transmitted to the contact 144(1) of the receptacle assembly 114. In both radial orientations of the assemblies 112 and 114, the contacts 144(2) and 144(4) are connected to a ground potential. In both radial orientations of the assemblies 112 and 114, the contacts 144(3) and 144(5) receive the signals. Thus, neither radial orientation is functionally different from the other. The connector 110 depicted in FIG. 9B may be particularly useful in a helmet-mounted night-vision system, as described in greater detail with reference to FIGS. 10-13.

FIG. 10 depicts the plug assembly 112 of FIG. 9B mounted to a battery pack 300. The battery pack 300 forms part of a helmet-mounted night-vision system. The battery pack 300 includes an interior region that houses one or more batteries (not shown). The batteries are electrically connected to the plug assembly 112. Further details of the battery pack 300 are disclosed in U.S. patent application Ser. No. 12/277,750, which is incorporated by reference herein in its entirety.

Figure 11:
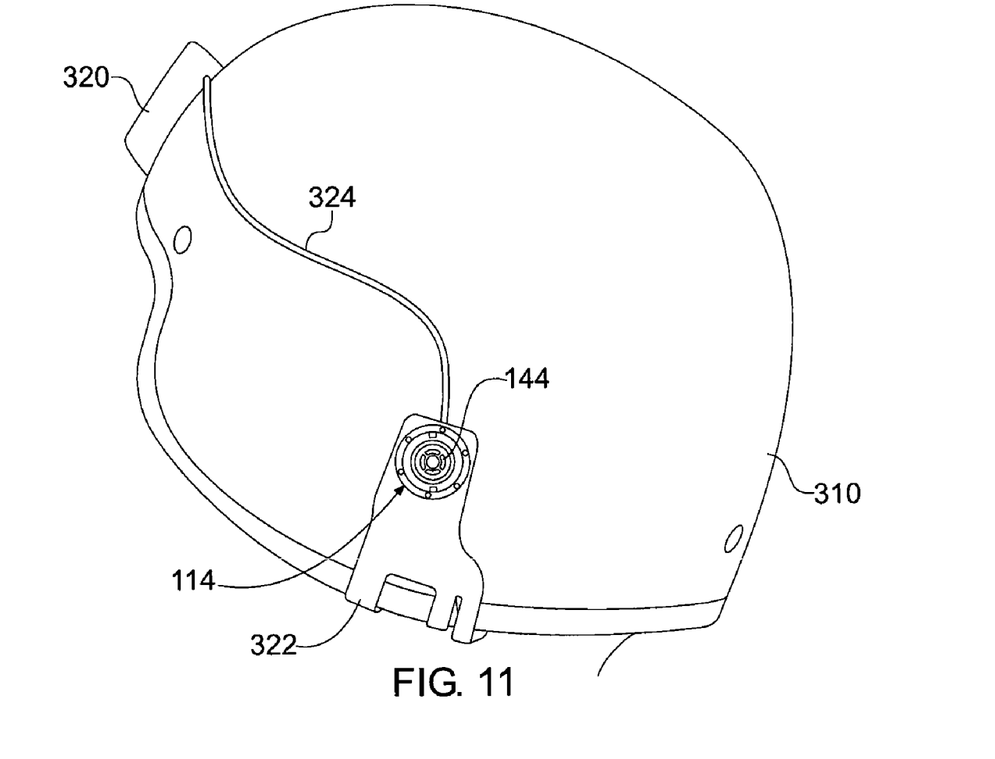
FIG. 11 depicts the receptacle assembly of FIG. 9B mounted to a helmet.

FIG. 11 depicts the receptacle assembly 114 of FIG. 9B mounted to a helmet 310 incorporating a night vision device 320. Although not shown, the helmet 310 includes provisions for mounting the night vision device 320 thereto. Helmet-mounted night vision devices are disclosed, for example, in U.S. Pat. Nos. 7,211,778, 7,049,027, 6,938,276, 6,662,370, and 5,683,831, 4,666,276, 4,329,735, for example, which are incorporated by reference herein in their entirety. The receptacle assembly 114 is fixedly mounted to a plate 322 that is mounted to the helmet 310. The plate 322 is mounted to the rear or side of the helmet 310. The electrical contacts 144 of the receptacle assembly 114 are electrically connected to a shielded cable 324. The shielded cable 324 is also connected to the night vision device 320 for transmitting power from the batteries of the battery pack 300 to the night vision device 320.

Figure 12:
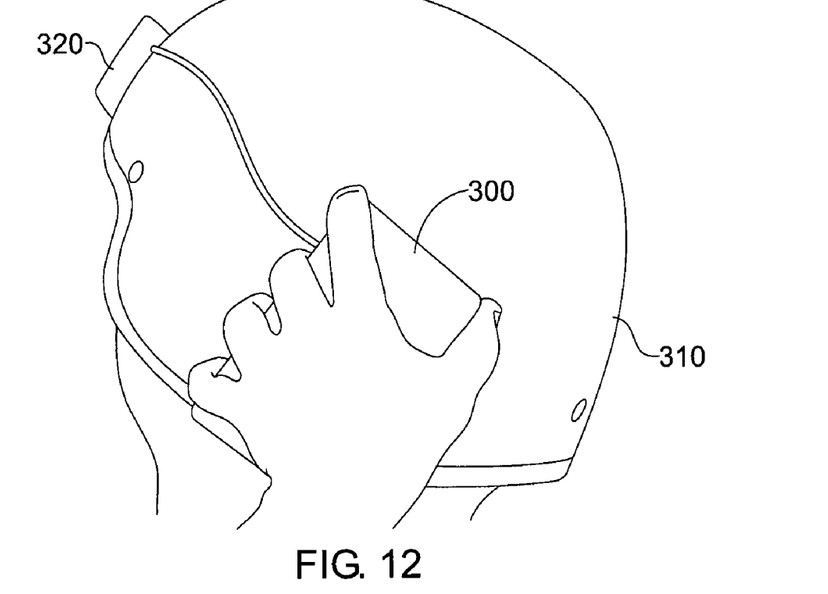
FIG. 12 depicts an initial step of installing the plug assembly of the battery pack of FIG. 10 onto the receptacle assembly of the helmet of FIG. 11.
Figure 13:
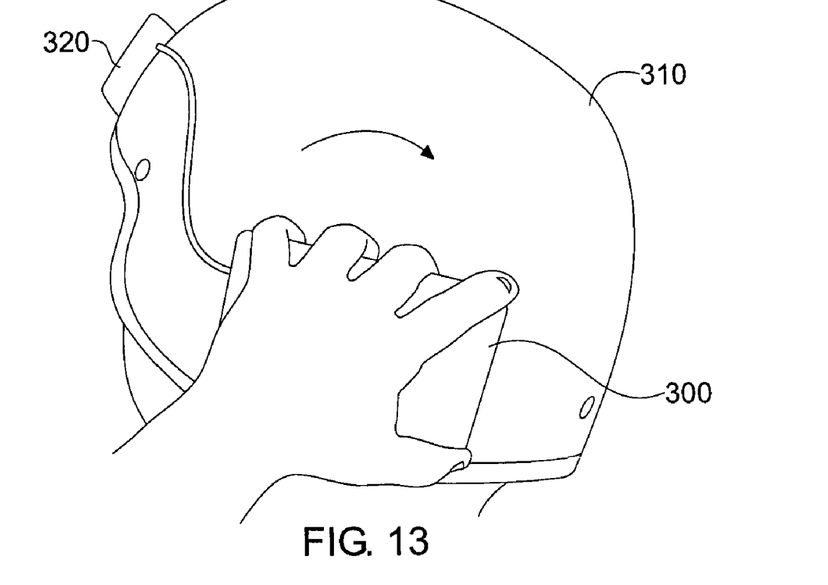
FIG. 13 depicts the step of rotating the battery pack with respect to the helmet to connect the plug and the receptacle and lock the battery pack to the helmet.

FIG. 12 depicts an initial step of installing the plug assembly 112 of the battery pack 300 onto the receptacle assembly 114 of the helmet 310. FIG. 13 depicts the step of rotating the battery pack 300 with respect to the helmet 310 to connect the plug assembly 112 with the receptacle assembly 114 and lock the battery pack 300 to the helmet 310.

According to one method of assembling the battery pack 300 onto the helmet 310, the user first grasps the rectangular battery pack 300 along its narrow portion (see FIG. 10) and brings the plug assembly 112 of the battery pack 300 in close proximity to the receptacle assembly 114 of the helmet 310. The user then rotates the entire battery pack 300 until the passageways 131 of the plug assembly 112 are aligned with protrusions 150 of the receptacle assembly 114 (corresponding to the position FIG. 7A). The plug assembly 112 of the battery pack 300 has two possible orientations for engagement with receptacle assembly 114 of the helmet 310 that are spaced apart by 180 degrees. Upon alignment between the passageways 131 and the protrusions 150, the user pushes the battery pack 300 further toward against the force of the spring 54 of the receptacle assembly 114 (see FIG. 4). As shown in FIG. 13, the user then rotates the battery pack 300 (see arrow) with respect to the helmet 310 until the protrusions 150 are seated within their respective recesses 53 (corresponding to the motion depicted in FIGS. 7B-7D). A connection is thus formed between the battery pack 300 and the night vision device 320 in FIG. 13.

As mentioned previously, neither radial orientation of the assemblies 112 and 114 is functionally different from the other. Accordingly, the user may attach the battery pack 300 in an intuitive motion without looking or otherwise identifying a specific "up or down" position of the battery pack 300. The connector 110 is generally intuitive, familiar, and ergonomic for the end-user. The connector 110 facilitates removal or installation of the battery pack 300 quickly and easily because the battery pack 300 is naturally oriented as an effect of the normal reach of the user's hand.

Referring now to FIGS. 9B and 13, the electrical contacts 144(3), 144(5), 124(6) and 124(9) distribute signals between the battery pack 300 and the night vision device 320. Signals are transmitted from the night vision device 320 to the battery pack 300 to either activate or deactivate the battery pack 300 depending upon the whether the night vision device 320 is in active use by an end-user.

More particularly, in operation, once the user moves the night vision device 320 to a deployed position (i.e., within his or her line of sight), the night vision device 320 transmits a signal to the battery pack 300 (via electrical contacts 144(3), 144(5), 124(6) and 124(9)) to activate the battery pack 300. Once the user moves the night vision device 320 to a stowed position (i.e., out of his or her line of sight), the night vision device 320 transmits a signal to the battery pack 300 (via electrical contacts 144(3), 144(5), 124(6) and 124(9)) to deactivate the battery pack 300. The signals that are transmitted between those electrical contacts are indistinguishable, thus, regardless of whether the contacts 144(3) and 144(5) of the receptacle assembly 114 are mated with the contacts 124(6) and 124(9) of the plug assembly 112, respectively, or vice versa, the proper signals reach the battery pack 300.

By way of non-limiting example the connectors described herein, or modified versions thereof, may be used in the following applications: combat ground troops, ground support personnel, fixed wing aviation, rotary aircraft aviation, aviation ground support personnel, vehicle transport (utility), vehicle transport (armor), security, military, law enforcement (police or SWAT), boating (navigation), commercial fisherman (navigation), commercial maintenance, virtual reality entertainment, virtual reality training or medical equipment.

Although the invention is illustrated and described herein with reference to specific embodiments, the invention is not intended to be limited to the details shown. Rather, various modifications may be made in the details within the scope and range of equivalents of the claims and without departing from the spirit of the invention. For example, the connector described herein may be utilized with a night vision goggle, however, it will be understood that the invention can be used with other electronic devices or sighting devices, such as a monocular or binoculars, cameras, helmet mounted display screen, head-up display or any other helmet mounted optical, electro-optical, and/or viewing devices.

What is claimed:

1. An electrical connector for a helmet-mounted optical system comprising:
    either a receptacle assembly or a plug assembly that is configured to be mechanically coupled either directly or indirectly to a helmet and electrically coupled to optical device that is mounted to the helmet; and
    the other of the plug assembly and the receptacle assembly is configured to be mechanically and electrically coupled to a battery pack,
    wherein each assembly includes a body having a rounded surface and at least one electrical contact positioned within the body,
    wherein a protrusion extends from the rounded surface of either the plug assembly or the receptacle assembly and at least two slots are defined along the rounded surface of the other of the plug assembly and the receptacle assembly and each slot is sized to receive the protrusion,
    wherein the plug assembly and the receptacle assembly are configured to be releasably mated together in at least two different orientations by inserting the protrusion into one of the slots and rotating either the plug assembly or the receptacle assembly to releasably mount the battery pack to the helmet and establish an electrical connection between the at least one electrical contact of the plug assembly and the at least one electrical contact of the receptacle assembly.

2. The electrical connector of claim 1, wherein the at least two orientations are radially separated from each other.

3. The electrical connector of claim 2, wherein the at least two orientations are radially separated from each other by at least ninety degrees.

4. The electrical connector of claim 1, wherein the receptacle connector and the plug connector are configured to be releasably mated together in at least three different orientations.

5. The electrical connector of claim 1 wherein the slot includes a cam surface defined along the rounded surface of the other of the plug assembly and the receptacle assembly.

6. The electrical connector of claim 5, wherein upon engagement between the plug assembly and the receptacle assembly, the protrusion is positioned within one of the slots, the rounded surfaces of the assemblies are positioned to face each other, and, upon rotation of the assemblies with respect to one another, the protrusion is positioned along the cam surface causing the at least one electrical contact of the plug assembly to bear against the at least one electrical contact of the receptacle assembly thereby establishing an electrical connection between the plug assembly and the receptacle assembly.

7. The electrical connector of claim 6, wherein the cam surface defines a recess that is sized to receive the protrusion, and upon further rotation of the assemblies with respect to one another the protrusion seats within the recess of the cam surface.

8. The electrical connector of claim 6 further comprising a spring positioned between the plug and the receptacle to bias the protrusion in a direction toward the recess of the cam surface or bias the recess of the cam surface in a direction toward the protrusion.

9. The electrical connector of claim 6 further comprising a plurality of protrusions spaced apart along the circumference of the rounded surface of either the plug assembly or the receptacle assembly.

10. The electrical connector of claim 1, wherein the protrusion extends radially inwardly toward a longitudinal axis of either the plug assembly or the receptacle assembly.

11. A helmet-mounted night vision assembly comprising:
    a helmet including provisions for mounting a night vision device thereto;
    a receptacle assembly mounted to the helmet;
    a battery pack configured to contain at least one battery, said battery pack including a plug assembly mounted to a surface of the battery pack;
    the plug assembly and the receptacle assembly each including a body having a revolved surface and at least one electrical contact positioned within the body; and
    a protrusion extending from the revolved surface of either the plug assembly or the receptacle assembly and a cam surface defined along the revolved surface of the other of the plug assembly and the receptacle assembly,
    wherein the plug assembly and the receptacle assembly are configured to be releasably mated together in at least two different orientations for releasably mounting the battery pack to the helmet and supplying power from the battery of the battery pack to a night vision device that is mounted to the helmet.

12. The helmet-mounted night vision assembly of claim 11, wherein the receptacle assembly is not mounted to the front of the helmet.

13. The helmet-mounted night vision assembly of claim 11 further comprising a night vision device mounted to the helmet.

14. The helmet-mounted night vision assembly of claim 11, wherein the at least two orientations are radially separated from each other.

15. The helmet-mounted night vision assembly of claim 14, wherein the at least two orientations are radially separated from each other by at least ninety degrees.

16. The helmet-mounted night vision assembly of claim 11, wherein upon engagement between the plug assembly and the receptacle assembly the revolved surfaces of the assemblies are positioned to face each other and upon rotation of the assemblies with respect to one another the protrusion is positioned to move along the cam surface causing the at least one electrical contact of the plug assembly to bear against the at least one electrical contact of the receptacle assembly thereby establishing an electrical connection between the plug assembly and the receptacle assembly.

17. An electrical connector for a helmet-mounted night vision system comprising:

a receptacle assembly that is configured to be mechanically coupled either directly or indirectly to a helmet and electrically coupled to a night vision device that is mounted to the helmet;

a plug assembly that is configured to be mechanically and electrically coupled to a battery pack, wherein the plug assembly and the receptacle assembly are configured to be releasably mated together in at least two different orientations for releasably mounting the battery pack to the helmet and supplying power from the battery pack to a night vision device that is mounted to the helmet, wherein each assembly includes a body having a revolved surface and at least one electrical contact positioned within the body; and a protrusion extending from the revolved surface of either the plug assembly or the receptacle assembly and a cam surface defined along the revolved surface of the other of the plug assembly and the receptacle assembly.

* * * * *